United States Patent
Watanabe

[11] Patent Number: 6,115,133
[45] Date of Patent: Sep. 5, 2000

[54] PRINTER DRIVER

[75] Inventor: Masaki Watanabe, Tokyo, Japan

[73] Assignee: NEC Corporation, Tokyo, Japan

[21] Appl. No.: 09/148,702

[22] Filed: Sep. 4, 1998

[30] Foreign Application Priority Data

Sep. 5, 1997 [JP] Japan ................................. 9-240998

[51] Int. Cl.[7] .................................................. G06F 15/00
[52] U.S. Cl. ........................... 358/1.15; 358/1.6; 358/1.9; 358/501; 358/537
[58] Field of Search ...................... 358/1.6, 1.9, 296.501, 358/515, 518, 519, 537, 447, 448, 452, 502, 520; 347/43, 115, 172, 184

[56] References Cited

U.S. PATENT DOCUMENTS 5,717,838  2/1998  LeClair ..................................... 358/1.9
5,844,688  12/1998 Shimizu et al. ......................... 358/296

FOREIGN PATENT DOCUMENTS 7-93076    4/1995  Japan.
8-69361    3/1996  Japan.
8-185294   7/1996  Japan.
8-242376   9/1996  Japan.
9-193477   7/1997  Japan.
9-198217   7/1997  Japan.
11-53137   2/1999  Japan.

Primary Examiner—Edward L. Coles
Assistant Examiner—Mark Wallerson
Attorney, Agent, or Firm—Foley & Lardner

[57] ABSTRACT

A printer driver includes a CPU, a setting information storage section, and a color matching module. The CPU sets, on a setting window, print setting information including color setting information for a color printer. The setting information storage section stores the print setting information set by the CPU in association with a print file name. The color matching module corrects colors of print data on the basis of color setting information included in the print setting information retrieved from the setting information storage section in accordance with a file name of print data in printing.

12 Claims, 4 Drawing Sheets

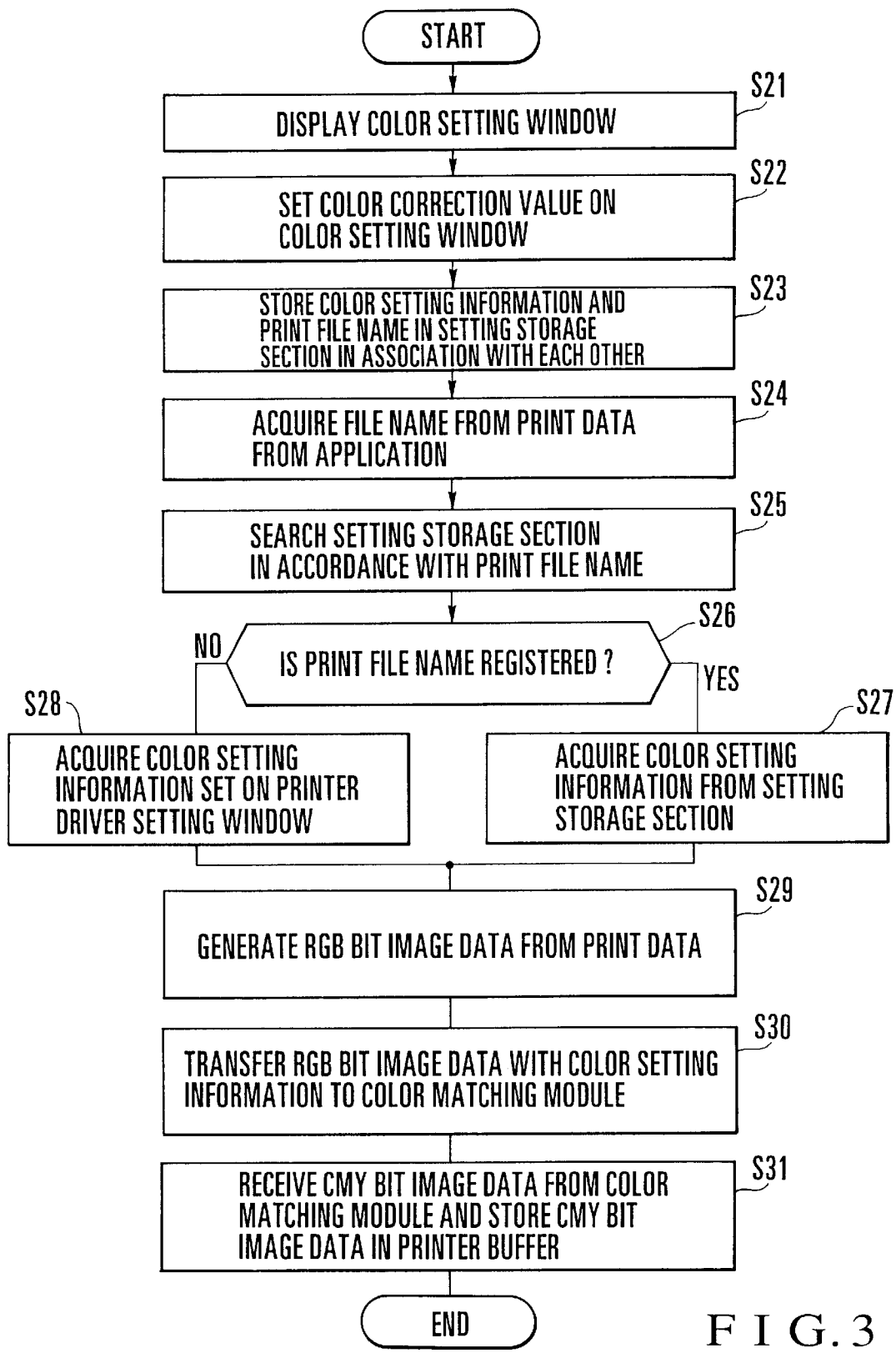
F I G. 3

PRINTER DRIVER

BACKGROUND OF THE INVENTION

The present invention relates to a color printer and, more particularly, to a printer driver for converting color output data into optimum color data in units of print file names of a printer and outputting the optimum color data to the printer device.

In a conventional color printer driver used for an ink-jet printer or a color laser printer, the print result often differs from the color tone displayed on a display device or the like. For this reason, the user can finely designate color setting based on his/her taste on, e.g., the color setting window (color setting window) of a printer setting window.

However, to correct colors for print according to the user's taste, test print must be performed while changing color setting on the color setting window many times by trial and error. In addition, since the color balance changes in units of print data, one color set value does not always suffice. Print data must be changed for every print, and this processing is cumbersome and takes a time.

A printer driver for solving this problem is disclosed in Japanese Patent Laid-Open No. 8-185294 (reference 1). In this printer driver, combined information set on an item window is stored in a hard disk together with user information. When the input section designates the user information, the system board retrieves combined information corresponding to the designated user information and sets it as print conditions.

In the above-described conventional printer driver, however, if another data is printed, or the power supply is turned off, the colors must be corrected again from the beginning while repeating test print many times. Although the user can finely adjust the colors, a long time is required to correct the colors of each print data, and the resetting operation imposes a heavy load on the user.

In the method described in reference 1, since the combined information set on the driver item window has no association for each print data, the combined information corresponding to the user information must be retrieved before printing.

SUMMARY OF THE INVENTION

It is an object of the present invention to provide a printer driver with an improved user operability.

In order to achieve the above object, according to the present invention, there is provided a printer driver comprising information setting means for setting, on a setting window, print setting information including color setting information for a color printer, information storage means for storing the print setting information set by the information setting means in association with a print file name, and color correction means for correcting colors of print data on the basis of color setting information included in the print setting information retrieved from the information storage means in accordance with a file name of print data in printing.

BRIEF DESCRIPTION OF THE DRAWINGS

FIG. 3 is a flow chart for explaining the operation of a printer driver shown in FIG. 1;

DESCRIPTION OF THE PREFERRED EMBODIMENTS

The present invention will be described below with reference to the accompanying drawings.

Figure 1:
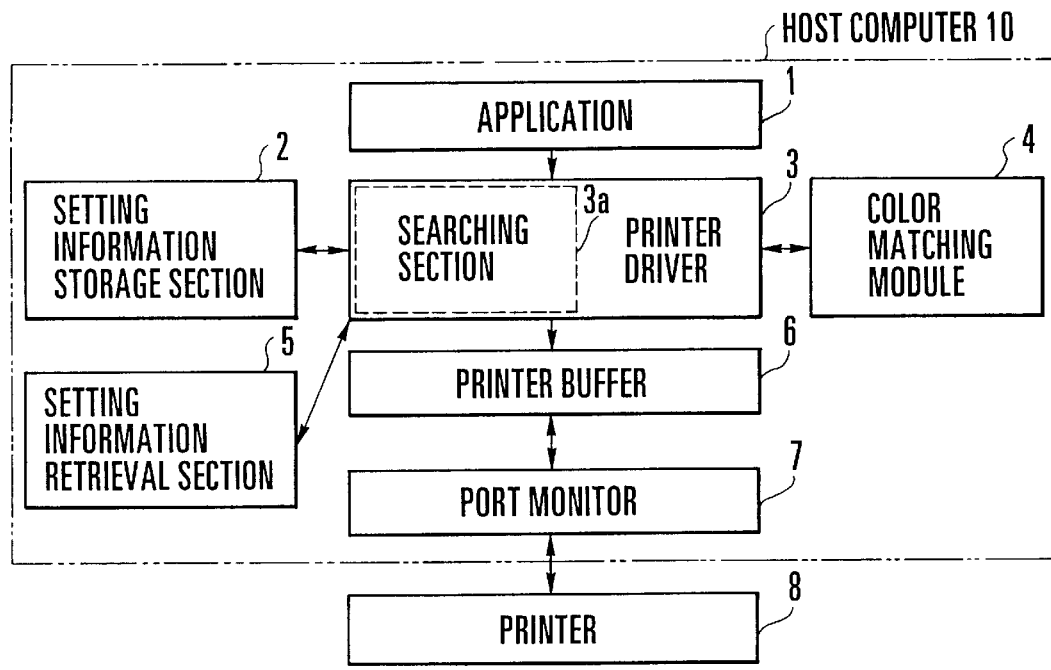
FIG. 1 is a functional block diagram of a print system according to the first embodiment of the present invention.

FIG. 1 shows a print system according to the first embodiment of the present invention. In FIG. 1, reference numeral 1 denotes an application running on the windows system; 2, a setting information storage section for storing color setting information (color setting parameters) set on a color setting window together with a file name of print data (to be referred to as a print file name hereinafter); and 3, a printer driver for generating RGB (Red, Green, and Blue) bit image data having three primary colors of light from the print data and controlling printing. The printer driver 3 has a searching section 3a for searching the setting information storage section 2 on the basis of a print file name.

Reference numeral 4 denotes a color matching module for color-converting RGB bit image data into CMY (Cyan, Magenta, and Yellow) bit image data having three primary colors for subtractive mixture on the basis of color setting information; 5, a setting information retrieval section for retrieving the color setting information stored in the setting information storage section 2, on the basis of the searching result of the searching section 3a in correspondence with the print file name; 6, a printer buffer for sequentially storing CMY bit image data of a predetermined unit generated by the printer driver 3; 7, a port monitor for sequentially sending the CMY bit image data stored in the printer buffer 6 to a printer 8 using a bidirectional communication means; and 10, a host computer comprising the above-described elements.

Figure 2:
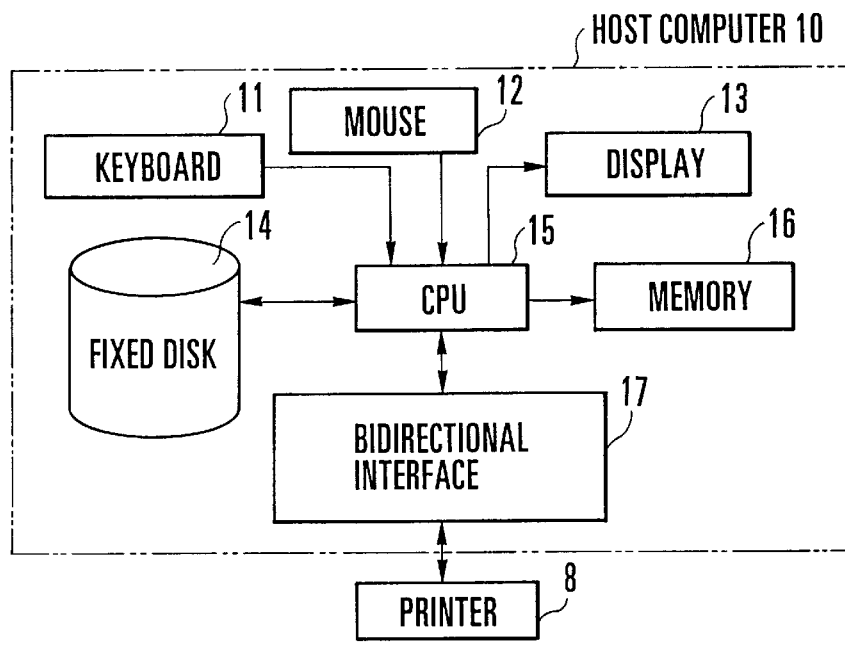
FIG. 2 is a view showing the hardware configuration of the print system shown in FIG. 1.

FIG. 2 shows the hardware configuration of the host computer 10 shown in FIG. 1. Referring to FIG. 2, in the host computer 10, a system program manages various application programs on the basis of a predetermined operating system (to be referred to as an OS hereinafter). A CPU (Central Processing Unit) 15 controls a keyboard 11 used to input information, a display 13, and a fixed disk 14 storing programs and data.

The CPU 15 sequentially executes a program read from the fixed disk 14 to a memory 16, thereby realizing various functions. The display 13 displays a predetermined window in correspondence with each application. Clicking a printer driver setting window displayed on the display 13 causes the display 13 to display a printer color setup window. Hence, the CPU 15 functions as a means for setting print setting information such as color setting information.

The printer 8 is connected to the CPU 15 through a bidirectional interface 17. A mouse 12 connected to the CPU 15 serves as a pointing device. The printer 8 can be stand-alone or connected to the host computer 10 through a network.

An operation of printing a bitmap photograph using an application on the windows system having the print system with the above arrangement will be described next with reference to the flow chart of FIG. 3.

Figure 4:
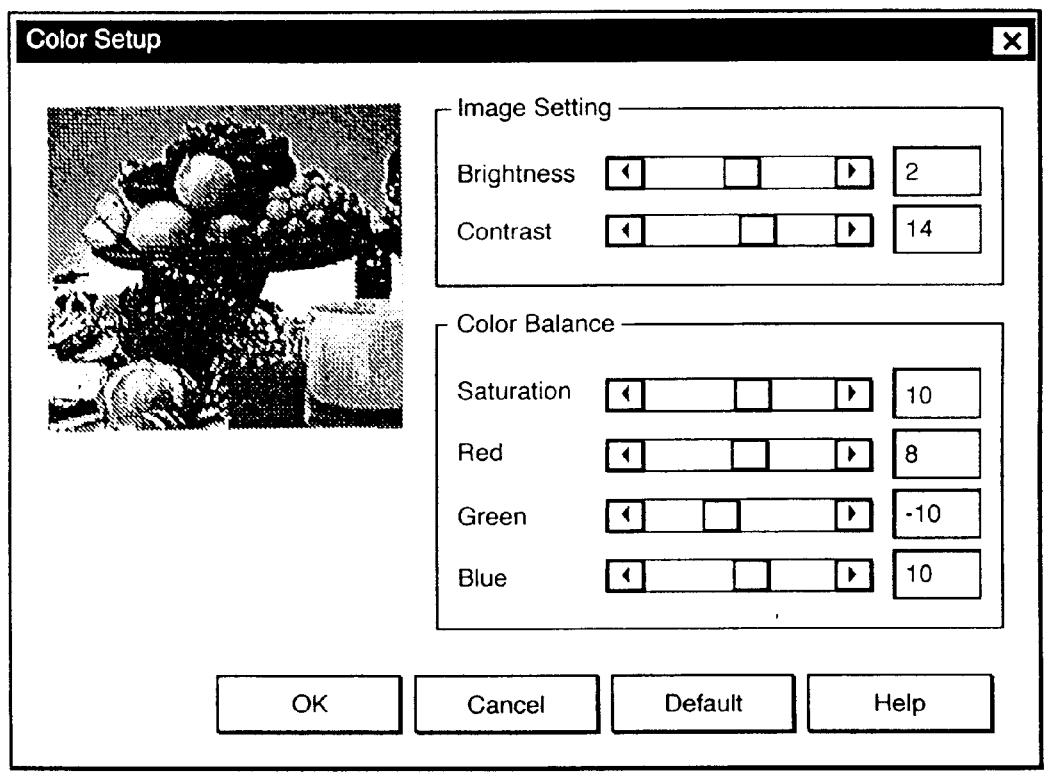
FIG. 4 is a view showing a color setting window in the print system shown in FIG. 1.

First, from the application 1, the printer 8 prints print data in accordance with the default values. To obtain a brighter print result, the color setting window in the printer setting window is displayed on the display 13 by operating the keyboard 11 or the mouse 12 (step S21), thereby displaying the dialogue of the color setting window, as shown in FIG. 4. In the dialogue of the color setting window, e.g., "10" is set for "brightness" or a setting item for adjusting the brightness (step S22). After this, test print is performed on the basis of this color setting value.

If the desired print result is obtained, a print file name is input on the dialogue of the color setting window, and color setting parameters are stored in the setting information storage section 2 in association with the print file name (step S23). That is, color setting information is stored in the color setting information f ile of the setting information storage section 2 in units of print files.

A method of retrieving the color setting information set in the setting information storage section 2 in printing, i.e., a method of performing printing from the application 1 by using the color setting information after the above-described color correction/adjustment will be described next.

To execute printing from a certain application 1, print data of a predetermined unit is received from the application 1 by the printer driver 3. Since the print data sent from the application 1 includes the information of the print file name, the printer driver 3 acquires the print file name from the print data (step S24). The searching section 3a of the printer driver 3 searches the setting information storage section 2 for the color setting information file corresponding to the acquired print file name (step S25) and determines whether the print file name is registered (step S26).

If YES in step S26, the printer driver 3 controls the setting information retrieval section 5 to acquire, from the setting information storage section 2, the color setting information ("Brightness"="10") registered in association with the print file name (step S27). The printer driver 3 generates RGB bit image data from the print data (step S29) and then transfers the RGB bit image data, to which the acquired color setting information is added as its header, to the color matching module 9 (step S30).

The color matching module 9 color-converts the RGB bit image data into CMY bit image data on the basis of the added color setting information and returns the CMY bit image data to the printer driver 3. Upon receiving the CMY bit image data from the color matching module 9, the printer driver 3 stores the data of a predetermined unit in the printer buffer 6 (step S31). The print data stored in the printer buffer 6 is sequentially transferred to the printer 8 by the port monitor 7 and printed.

If NO in step S26, color setting information currently set on the color setting window is acquired (step S28).

Subsequently, as in the above-described case, the color setting information acquired from the color setting window is added to RGB bit image data generated from the print data as header data and transferred to the color matching module 4 in steps S29 and S30. Finally, in step S31, the printer driver 3 stores CMY bit image data of a predetermined unit, which is received from the color matching module 9, in the printer buffer 6.

Figure 5:
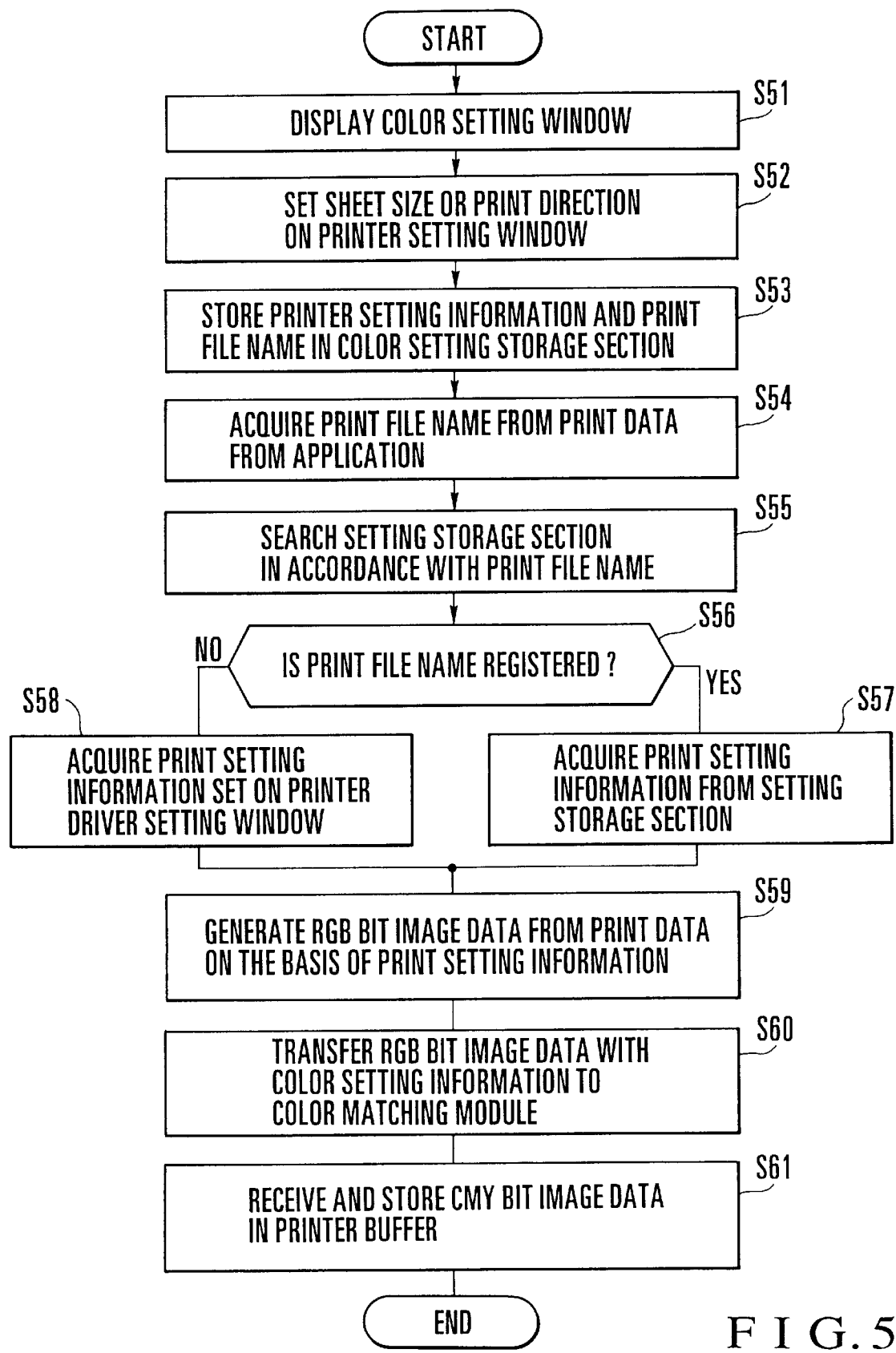
FIG. 5 is a flow chart for explaining the operation of a printer driver according to the second embodiment of the present invention.

The second embodiment of the present invention will be described next with reference to the flow chart of FIG. 5.

In the above-described first embodiment, only the color setting information used by the color matching module 4 as parameters is stored in the setting information storage section 2 in association with the print file name. As the characteristic feature of the second embodiment, not only color setting information but also printer setting information such as the type of paper sheet, the sheet size, the print direction, and the print quality which can be set on the printer setting window are stored in association with a print file name. A case wherein a bitmap photograph is to be printed landscape on a postal card by an application on the windows system will be described below.

A printer setting window is opened from an application 1 (step S51), and the sheet size (postal card) and the print direction (landscape) are set as printer setting information (step S52). Next, a print file name and print setting information including the printer setting information and color setting information after color adjustment based on test print are stored in a setting information storage section 2 in association with each other (step S53).

In printing, a printer driver 3 acquires the print file name from print data sent from the application 1 (step S54). The printer driver 3 searches the setting information storage section 2 for the setting recording information file in accordance with the acquired print file name (step S55) and determines whether the print file name is registered (step S56).

If YES in step S56, the printer driver 3 controls a setting information retrieval section 5 to acquire, from the setting information storage section 2, the print setting information including the color setting information registered in association with the print file name (step S57). Next, the printer driver 3 generates RGB bit image data from the print data on the basis of the print setting information (step S59), and then transfers the RGB bit image data to which the acquired color setting information is added as its header to a color matching module 9 (step S60).

The color matching module 9 color-converts the RGB bit image data into CMY bit image data on the basis of the added color setting information and returns the CMY bit image data to the printer driver 3. Upon receiving the CMY bit image data from the color matching module 9, the printer driver 3 stores the data of a predetermined unit in a printer buffer 6 (step S61). The print data stored in the printer buffer 6 is sequentially transferred to a printer 8 by a port monitor 7 and printed.

If NO in step S56, print setting information including color setting information currently set on the printer setting window is acquired (step S58).

Subsequently, as in the above-described case, the color setting information acquired from the color setting window is added to RGB bit image data generated from the print data as header data and transferred to the color matching module 4 in steps S59 and S60. Finally, in step S61, the printer driver 3 stores CMY bit image data of a predetermined unit, which is received from the color matching module 9, in the printer buffer 6.

As has been described above, according to the present invention, once the user sets print conditions for the printer, the print conditions are set in units of print data files. Since printing can be automatically performed in accordance with the set print conditions without retrieving the printer setting information by an input operation, the operability is improved.

What is claimed is:

1. A printer driver comprising:

information setting means for setting, on a setting window, print setting information including color setting information for a color printer;

information storage means for storing the print setting information set by said information setting means in association with a print file name;

searching means for searching said information storage means in accordance with a file name of print data in printing;

information retrieval means for retrieving the print setting information stored in association with the print file name from said information storage means when the file name of print data corresponds to the print file name registered in said information storage means; and color correction means for correcting colors of print data on the basis of color setting information included in the print setting information retrieved from said information storage means by said information retrieval means in accordance with the print file name.

2. A driver according to claim 1, wherein said color correction means performs color correction using color setting information set on a color setting window when the file name of print data is not registered in said information storage means.

3. A driver according to claim 1, wherein the file name of print data is acquired from header data of the print data.

4. A driver according to claim 1, wherein said driver comprises printer control means for generating RGB bit image data from the print data, and said color correction means comprises a color matching module for converting the RGB bit image data from said printer control means into CMY bit image data.

5. A driver according to claim 4, wherein said printer control means outputs, to said color correction means, the RGB bit image data having the color setting information included in the print setting information retrieved by said information retrieval means, and said color correction means performs color correction on the basis of the added color setting information.

6. A driver according to claim 4, wherein printer setting conditions stored in said information storage means include printer setting information having at least a sheet size and a print direction, and when the file name of print data corresponds to the print file name registered in said information storage means, said printer control means generates the RGB bit image data on the basis of the printer setting information included in the print setting information retrieved by said information retrieval means.

7. A printer driver comprising:

an information setting section adapted to set, on a setting window, print setting information including color setting information for a color printer;

an information storage section adapted to store the print setting information set by said information setting section in association with a print file name;

a searching section adapted to search said information storage section in accordance with a file name of print data in printing;

an information retrieval section adapted to retrieve the print setting information stored in association with the print file name from said information storage section when the file name of print data corresponds to the print file name registered in said information storage section; and a color correction section that corrects colors of print data on the basis of color setting information included in the print setting information retrieved from said information storage section by said information retrieval section in accordance with the print file name.

8. A driver according to claim 7, wherein said color correction section performs color correction using color setting information set on a color setting window when the file name of print data is not registered in said information storage section.

9. A driver according to claim 7, wherein the file name of print data is acquired from header data of the print data.

10. A driver according to claim 7, wherein said driver further comprises a printer control section adapted to generate RGB bit image data from the print data, and said color correction section comprises a color matching module for converting the RGB bit image data from said printer control section into CMY bit image data.

11. A driver according to claim 10, wherein said printer control section outputs, to said color correction section, the RGB bit image data having the color setting information included in the print setting information retrieved by said information retrieval section, and said color correction section performs color correction on the basis of the added color setting information.

12. A driver according to claim 10, wherein printer setting conditions stored in said information storage section include printer setting information having at least a sheet size and a print direction, and when the file name of print data corresponds to the print file name registered in said information storage section, said printer control section generates the RGB bit image data on the basis of the printer setting information included in the print setting information retrieved by said information retrieval section.

* * * * *